(12) United States Patent
Bissbort et al.

(10) Patent No.: US 9,322,416 B2
(45) Date of Patent: Apr. 26, 2016

(54) MULTI-FUNCTIONAL PROPORTIONAL CONTROL VALVE FOR HYDRAULIC SUSPENSION SYSTEM FOR VEHICLE

(71) Applicants: Markus Bissbort, Contwig (DE); Joel Mekkes, Traverse, MI (US); Damiano Roberti, Rome (IT); Tomasz Slawinski, Northbrook, IL (US)

(72) Inventors: Markus Bissbort, Contwig (DE); Joel Mekkes, Traverse, MI (US); Damiano Roberti, Rome (IT); Tomasz Slawinski, Northbrook, IL (US)

(73) Assignee: HydraForce, Inc., Lincolnshire, IL (US)

( * ) Notice: Subject to any disclaimer, the term of this patent is extended or adjusted under 35 U.S.C. 154(b) by 13 days.

(21) Appl. No.: 14/205,110

(22) Filed: Mar. 11, 2014

(65) Prior Publication Data

US 2014/0251470 A1 Sep. 11, 2014

Related U.S. Application Data

(60) Provisional application No. 61/776,505, filed on Mar. 11, 2013.

(51) Int. Cl.
| | |
|---|---|
| *F16K 11/078* | (2006.01) |
| *F15B 1/04* | (2006.01) |
| *F04B 53/10* | (2006.01) |
| *F16K 31/06* | (2006.01) |
| *B60G 17/056* | (2006.01) |

(52) U.S. Cl.
CPC ................ *F15B 1/04* (2013.01); *B60G 17/056* (2013.01); *F04B 53/10* (2013.01); *F16K 31/0675* (2013.01); *B60G 2400/252* (2013.01); *B60G 2400/5182* (2013.01); *B60G 2500/203* (2013.01); *Y10T 137/86035* (2015.04); *Y10T 137/86614* (2015.04); *Y10T 137/86702* (2015.04)

(58) Field of Classification Search
CPC .............. F16K 31/0675; F16K 11/078; Y10T 137/86035; Y10T 137/86614; Y10T 137/86702; Y10T 137/8671; F15B 13/0417; F15B 13/0433
USPC ....................... 137/625.64, 625.68
See application file for complete search history.

(56) References Cited

U.S. PATENT DOCUMENTS

| | | |
|---|---|---|
| 4,525,695 A | 6/1985 | Sheng et al. |
| 4,674,613 A | 6/1987 | Sikorski |
| 4,796,661 A | 1/1989 | Hishinuma et al. |
| 5,108,070 A | 4/1992 | Tominaga |

(Continued)

FOREIGN PATENT DOCUMENTS

WO   WO 2005005842   1/2005

*Primary Examiner* — John Fox
(74) *Attorney, Agent, or Firm* — Leydig, Voit & Mayer, Ltd.

(57) ABSTRACT

A hydraulic suspension system includes a suspension cylinder, a pump, and a control valve therebetween. The control valve includes a spool reciprocally movable between a pump flow position and a tank flow position in which a control port of the control valve is in communication with a pump and a tank, respectively. A piloted logic element in fluid communication with and interposed between the control valve and the suspension cylinder is selectively movable between a through-flow position in which fluid can flow in either direction between a chamber of the suspension cylinder and the control port of the control valve and a blocked position in which fluid is prevented from flowing in or out of the chamber of the suspension cylinder. The logic element is biased to the blocking position, moving to the through-flow position when subjected to a crack pressure delivered from the control port of the control valve.

17 Claims, 10 Drawing Sheets

(56) References Cited

U.S. PATENT DOCUMENTS

| | | | | |
|---|---|---|---|---|
| 5,117,869 | A | 6/1992 | Kolchinsky | |
| 5,249,603 | A | 10/1993 | Byers, Jr. | |
| 5,251,671 | A | 10/1993 | Hiroki | |
| 5,513,673 | A | 5/1996 | Slavin et al. | |
| 5,664,417 | A | 9/1997 | Wilke et al. | |
| 5,787,915 | A | 8/1998 | Byers et al. | |
| 6,116,263 | A | 9/2000 | Liberfarb | |
| 6,167,906 | B1 | 1/2001 | Liberfarb | |
| 6,267,350 | B1 | 7/2001 | Slawinski et al. | |
| 6,327,959 | B1 * | 12/2001 | Takahashi et al. | 91/436 |
| 6,330,798 | B1 | 12/2001 | Stephenson | |
| 6,554,014 | B2 | 4/2003 | Beyrak | |
| 6,571,828 | B2 | 6/2003 | Harms et al. | |
| 6,598,622 | B1 * | 7/2003 | Reith et al. | 137/625.66 |
| 6,789,570 | B2 | 9/2004 | Beyrak et al. | |
| 6,805,155 | B2 | 10/2004 | Slawinski et al. | |
| 6,854,703 | B2 | 2/2005 | Parker et al. | |
| 6,966,329 | B2 | 11/2005 | Liberfarb | |
| 7,048,280 | B2 | 5/2006 | Brandenburger | |
| 7,063,100 | B2 | 6/2006 | Liberfarb | |
| 7,069,945 | B2 | 7/2006 | Slawinski et al. | |
| 7,137,406 | B2 | 11/2006 | Slawinski et al. | |
| 7,219,779 | B2 | 5/2007 | Bauer et al. | |
| 7,222,484 | B1 | 5/2007 | Dornbach | |
| 7,261,030 | B2 | 8/2007 | Liberfarb et al. | |
| 7,484,814 | B2 | 2/2009 | Dornbach | |
| 7,533,695 | B2 * | 5/2009 | Strauss et al. | 137/625.68 |
| 7,753,385 | B2 | 7/2010 | Bitter | |
| 7,841,360 | B2 * | 11/2010 | Bruck et al. | 137/625.68 |
| 7,921,880 | B2 * | 4/2011 | Jackson et al. | 137/881 |
| 8,096,568 | B2 | 1/2012 | Huth | |
| 8,118,060 | B2 * | 2/2012 | Stallmann | 137/625.68 |
| 8,253,063 | B2 | 8/2012 | Alexander et al. | |
| 8,272,403 | B2 * | 9/2012 | Stallmann | 137/625.69 |
| 8,662,109 | B2 * | 3/2014 | Bill et al. | 137/625.64 |
| 8,757,208 | B2 | 6/2014 | Dornbach | |
| 2003/0094201 | A1 | 5/2003 | Slawinski et al. | |
| 2004/0108001 | A1 | 6/2004 | Slawinski et al. | |
| 2004/0129322 | A1 | 7/2004 | Chen | |
| 2004/0154672 | A1 | 8/2004 | Liberfarb | |
| 2004/0206397 | A1 | 10/2004 | Liberfarb | |
| 2005/0045229 | A1 | 3/2005 | Slawinski et al. | |
| 2005/0050886 | A1 | 3/2005 | Bauer et al. | |
| 2005/0258607 | A1 | 11/2005 | Brandenburger | |
| 2006/0016495 | A1 * | 1/2006 | Strauss et al. | 137/625.65 |
| 2006/0086244 | A1 | 4/2006 | Liberfarb et al. | |
| 2007/0205207 | A1 | 9/2007 | Dornbach | |
| 2007/0210645 | A1 | 9/2007 | Dornbach | |
| 2009/0261541 | A1 | 10/2009 | Huth | |
| 2011/0139260 | A1 | 6/2011 | Dornbach et al. | |
| 2013/0069423 | A1 | 3/2013 | Rowan et al. | |

* cited by examiner

MULTI-FUNCTIONAL PROPORTIONAL CONTROL VALVE FOR HYDRAULIC SUSPENSION SYSTEM FOR VEHICLE

CROSS-REFERENCE TO RELATED APPLICATIONS

This patent application claims the benefit of priority to U.S. Provisional Patent Application No. 61/776,505, filed on Mar. 11, 2013, and entitled "Hydraulic Suspension System for Vehicles and Multi-Functional Proportional Control Valve for the Same," which is incorporated in its entirety herein by this reference.

TECHNICAL FIELD

This patent disclosure relates generally to a hydraulic suspension system and, more particularly, to a hydraulic suspension system (e.g., axle suspension, single wheel suspension, cabin suspension) where a combination of valves is used to control the suspension cylinder(s) to the nominal position when the load on the system has changed or to charge or discharge the rod side pressure in a double-acting system to thereby adjust the spring curve.

BACKGROUND

In conventional commercial systems, at least two solenoid valves are used to control a single-acting cylinder, and at least three solenoid valves (see, e.g., U.S. Pat. No. 8,096,568 B2 to Huth) or four solenoid valves (see, e.g., U.S. Patent Application Publication No. US005/0050886 A1 to Bauer et al.) are used to control a double-acting system independently at the same time. In other known systems, three solenoid valves in combination with one proportional pressure-reducing valve are used to control a double-acting system independently at the same time (see, e.g., U.S. Pat. No. 7,219,779 B2 to Wolfgang and U.S. Pat. No. 7,048,280 B2 to Brandenburger). Another known system uses two proportional and two solenoid valves to control a double-acting system independently (see, e.g., U.S. Pat. No. 7,753,385 B2 to Bitter).

Some existing systems are equipped with additional, non-integral check valves for load sensing/piloting. Additionally, check valves or low-leakage solenoid-operated valves are included in some conventional systems to hold the mechanical system rigid when power is not applied.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY OF THE DISCLOSURE

The present disclosure, in one aspect, is directed to embodiments of a hydraulic circuit configured to reduce the complexity and cost of the combination of valves used in a suspension system while maintaining equivalent or improved performance compared to existing solutions. In addition, the present disclosure, in another aspect, is directed to embodiments of a multi-function control valve adapted for use with embodiments of a hydraulic circuit where a single-acting cylinder can be controlled (extended and retracted) with only one control valve. In another aspect, embodiments of a multi-function control valve are included in a hydraulic circuit in which only two control valves are needed to allow independent control from the piston and rod side (extended and retracted or charging and discharging) of a double-acting system.

In one embodiment, a hydraulic suspension system includes a controller, a pump, a tank, a suspension cylinder, a proportional pressure-reducing/-relief control valve, and a logic element. The pump is adapted to provide a source of pressurized fluid, and the tank is adapted to hold a reservoir of fluid. The tank is in fluid communication with the pump. The suspension cylinder is in selective fluid communication with the pump. The suspension cylinder defines a chamber therein adapted to receive pressurized fluid.

The proportional pressure-reducing/-relief control valve is in electrical communication with the controller and in fluid communication with the pump. The control valve includes a spool reciprocally movable over a range of travel between at least a pump flow position in which the pump and a control port of the control valve are in fluid communication with each other and a tank flow position in which the tank and the control port of the control valve are in fluid communication with each other. The control valve is adapted such that the spool moves in response to a control signal received from the controller and the fluid pressure at the control port.

The logic element is in fluid communication with and interposed between the control valve and the suspension cylinder. The logic element includes a poppet selectively movable between a through-flow position in which fluid can flow in either direction between the chamber of the suspension cylinder and the control port of the control valve and a blocked position in which fluid is prevented from flowing out of the chamber of the suspension cylinder. The logic element is biased to the blocking position. The logic element is adapted to move from the blocking position to the through-flow position when a pressure at a fluid region upstream of the logic element poppet exceeds a predetermined crack pressure. The fluid region upstream of the logic element poppet is in fluid communication with the control port of the control valve.

In another aspect of the present disclosure, a multifunctional proportional control valve includes a control valve portion and a logic element portion in communication with the control valve portion. The control valve portion and the logic element portion are contained within a single cartridge arrangement.

The control valve portion includes a control valve cage and a hollow spool. The control valve cage defines a longitudinal interior passageway, a tank port, and a pump port. The tank and pump ports are in communication with the interior passageway. The spool defines a longitudinal spool passageway and a plurality of cross holes radially arranged about the spool. The cross holes are in communication with the spool passageway and the interior passageway of the control valve cage. The spool is disposed within the interior passageway of the control valve cage and reciprocally movable over a range of travel between a pump flow position in which the pump port of the control valve cage is open and the tank port of the control valve cage is closed and a tank flow position in which the tank port of the control valve cage is open and the pump port of the control valve cage is closed. The spool is biased to the pump flow position.

The logic element portion includes a logic element cage and a logic element poppet. The logic element cage defines a longitudinal interior logic element passageway and a logic element port in communication with the logic element passageway. The logic element passageway is in communication with the spool passageway. The logic element poppet is disposed within the logic element passageway of the logic element cage and is reciprocally movable over a range of travel between a blocking position in which the logic element port of the logic element cage is closed and a logic element through-flow position in which the logic element port of the logic element cage is open. The logic element poppet is biased to the blocking position such that the logic element poppet remains in the blocking position until a pressure at least equal to a crack pressure is applied to the logic element poppet against the biasing force, thereby unseating the logic element poppet from the blocking position and moving the logic element poppet toward the through-flow position.

Further and alternative aspects and features of the disclosed principles will be appreciated from the following detailed description and the accompanying drawings. As will be appreciated, the hydraulic circuits, the multi-function control valves, and methods disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
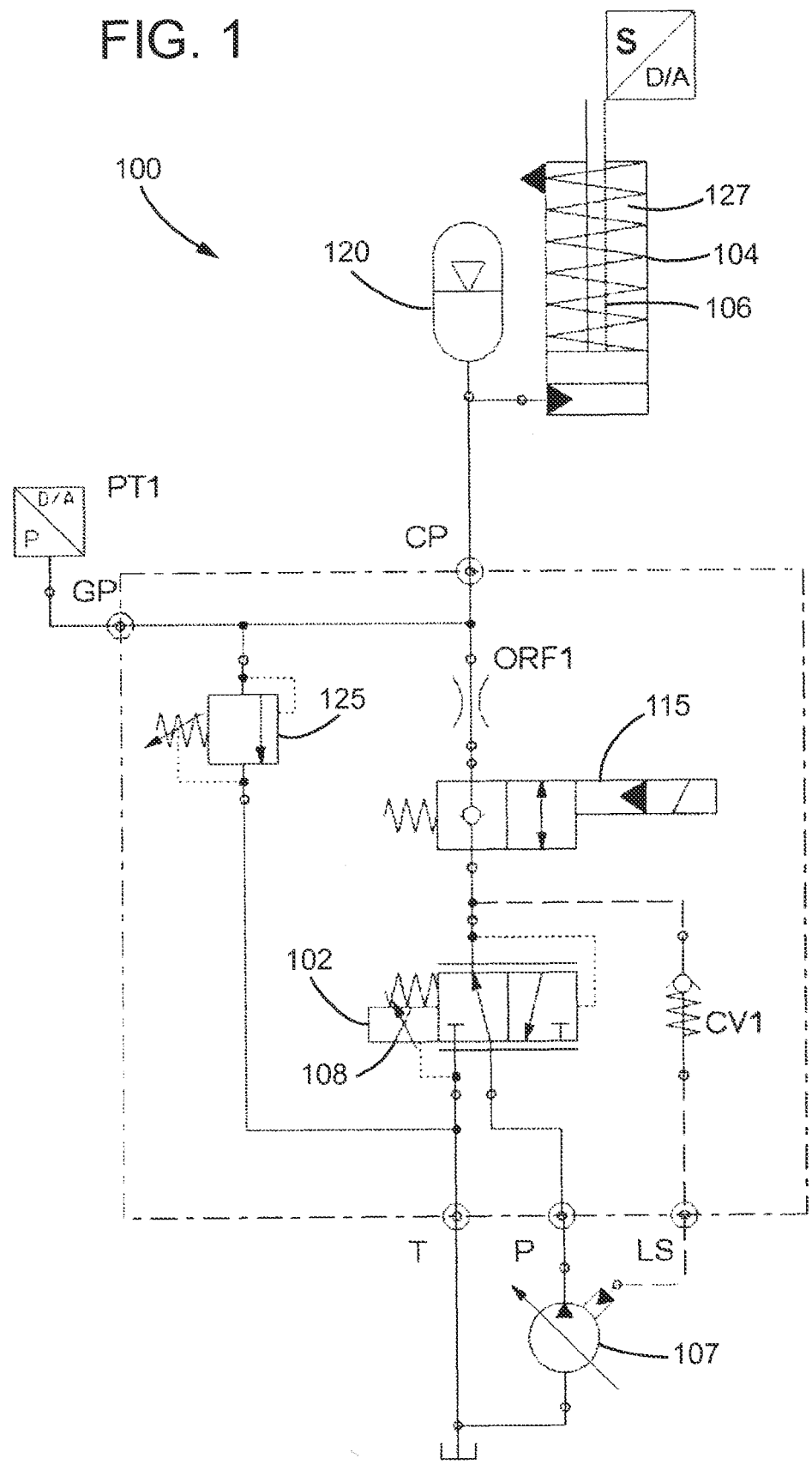
FIG. 1 is a schematic view of a hydraulic circuit.

Embodiments of a hydraulic circuit constructed in accordance with principles of the present disclosure are adapted to control the position and/or the pressure of a suspension cylinder (e.g., axle suspension, single wheel suspension, cabin suspension). In embodiments of a hydraulic suspension system, a proportional pressure-reducing/-relieving valve is adapted to open and close a piloted logic element valve to control the cylinder pressure/position. Embodiments of a hydraulic suspension circuit constructed in accordance with principles of the present disclosure can have the same or similar functionality as conventional circuits, but with reduced complexity.

Embodiments of a control valve constructed in accordance with principles of the present disclosure combine the functionality of several valves into one cartridge that is used to control the suspension cylinder(s) to the nominal position/pressure when the load on the system has changed. In embodiments, a control valve constructed in accordance with principles of the present disclosure combines the functionality of multiple conventional valves in a hydraulic suspension system constructed in accordance with principles of the present disclosure into one valve. In embodiments, a proportional valve in combination with a control strategy following principles of the present disclosure reduces the number of components (e.g., valves, controller outputs, manifold size) which are needed to control a suspension system.

Following principles of the present disclosure, embodiments of a hydraulic suspension system can achieve similar functionality as conventional systems but with reduced cost and complexity. Cost can be reduced by reducing the number of components and wire connections relative to prior solutions. For example, in embodiments, the system can be equipped with a smaller/lower weight manifold relative to one used in a conventional system that will still provide the desired performance characteristics.

Embodiments of a hydraulic suspension system according to principles of the present disclosure can have improved reliability as a result of using a reduced number of valves and wire connections and a corresponding reduced number of controller outputs. For example, in embodiments, only one controller output and one coil are used for a single-acting system, and only two controller outputs and two coils are used for a double-acting system.

In embodiments, a hydraulic suspension system and a multi-functional control valve constructed in accordance with principles of the present disclosure can provide enhanced system performance in that proportional control can be provided, rather than simply an on/off condition. In embodiments, two digital control outputs with a third stage (off, on-low, on-high) can be used to control the hydraulic suspension system. In other embodiments, one digital control output with one proportional output can be provided but without the need for a pressure transducer. In still other embodiments including one digital control output and one proportional output, pressure on a rod side of the suspension cylinder can be kept constant during the stroke of the piston assembly by using a level-control feature on the piston side.

In embodiments of a double-acting system following principles of the present disclosure, two proportional control outputs can be provided which can yield higher performance of the control algorithm (e.g., in combination with uni-directional restrictors or without restrictors). The speed of the level and the pressure control is adjustable. Independent control of the piston side (level control) and the rod side (pressure control) with two independent valves (charge and discharge at the same time) is possible. The pressure on the rod side can be adjusted to different settings to thereby produce different spring curves. This adjustment can be done related to several parameters, such as driving speed, axle load, drivers setting, etc. Systems constructed according to principles of the present disclosure can be used as an active suspension system (in special situations, for example, during braking or during acceleration).

In combination with two proportional outputs, the pressure can be controlled continuously with a multi-functional control valve constructed according to principles of the present disclosure to a desired value. A multi-functional control valve constructed according to principles of the present disclosure can be contained within a single cartridge available in different sizes to accommodate different flow requirements. In single-acting systems, embodiments of a valve constructed in accordance with principles of the present disclosure can be included into the cylinder bottom without the need for a manifold. A multi-functional control valve constructed according to principles of the present disclosure can be used in a variety of applications, including a suspension system and a single or double-acting hitch, for example.

Turning now to the Figures, a hydraulic circuit 100 is shown in FIG. 1. A proportional pressure-reducing/-relieving valve 102 can be used to control a single-acting cylinder 104. By increasing or decreasing the control pressure of the pressure-reducing/-relieving valve 102, a cylinder rod 106 of the single-acting cylinder 104 can be extracted or retracted. If the pressure setting of the proportional valve 102 is held constant, the cylinder rod 106 position stays fixed. A variable displacement pump 107 can be adapted to selectively provide a source of pressurized hydraulic fluid to the cylinder 104 through the pressure-reducing/-relieving valve 102.

In the case of a suspension cylinder, the valve 102, operating alone, is kept permanently energized to hold a position. If the valve 102 were de-energized, the cylinder rod 106 would retract under any load. Constantly energizing the coil 108 of the valve 102 to hold a load requires the use of both electric and hydraulic energy, which may be undesirable and pose a safety concern in that the machine behavior may become unpredictable should power be lost during operation.

To avoid the need to constantly energize the coil 108 of the valve 102, the circuit 100 of FIG. 1 includes a solenoid-operated, two-way/two-position poppet valve 115. The function of the solenoid poppet valve 115 in the circuit 100 of FIG. 1 is to work as a load-hold, or position-hold, valve. The position of the cylinder rod 106 can be changed with the pressure-reducing/-relieving valve 102 with the solenoid poppet valve 115 being operated at the same time. As soon as the reference position is reached, the solenoid poppet valve 115 and the pressure-reducing/-relieving valve 102 can be de-energized. The position of the cylinder rod 106 can be maintained, substantially leakage free, by the solenoid poppet valve 115. An accumulator 120 can be provided to reduce the rate of pressure increase as the cylinder rod 106 strokes. A relief valve 125 can be provided to protect the cylinder 104 and the accumulator 120 from excessive pressure spikes.

The circuit 100 of FIG. 1 uses two solenoids 102, 115 to control the single-acting cylinder 104. The circuit 100 of FIG. 1, however, can allow for the lowering and lifting speed to be adjusted, depending on the control current to the proportional pressure-reducing/-relieving valve 102. If this concept is used with a double-acting system, the pressure in a cylinder rod side 127 of the cylinder 104 can be controlled with the pressure reducing valve 102 without the need of a pressure transducer.

Figure 2:
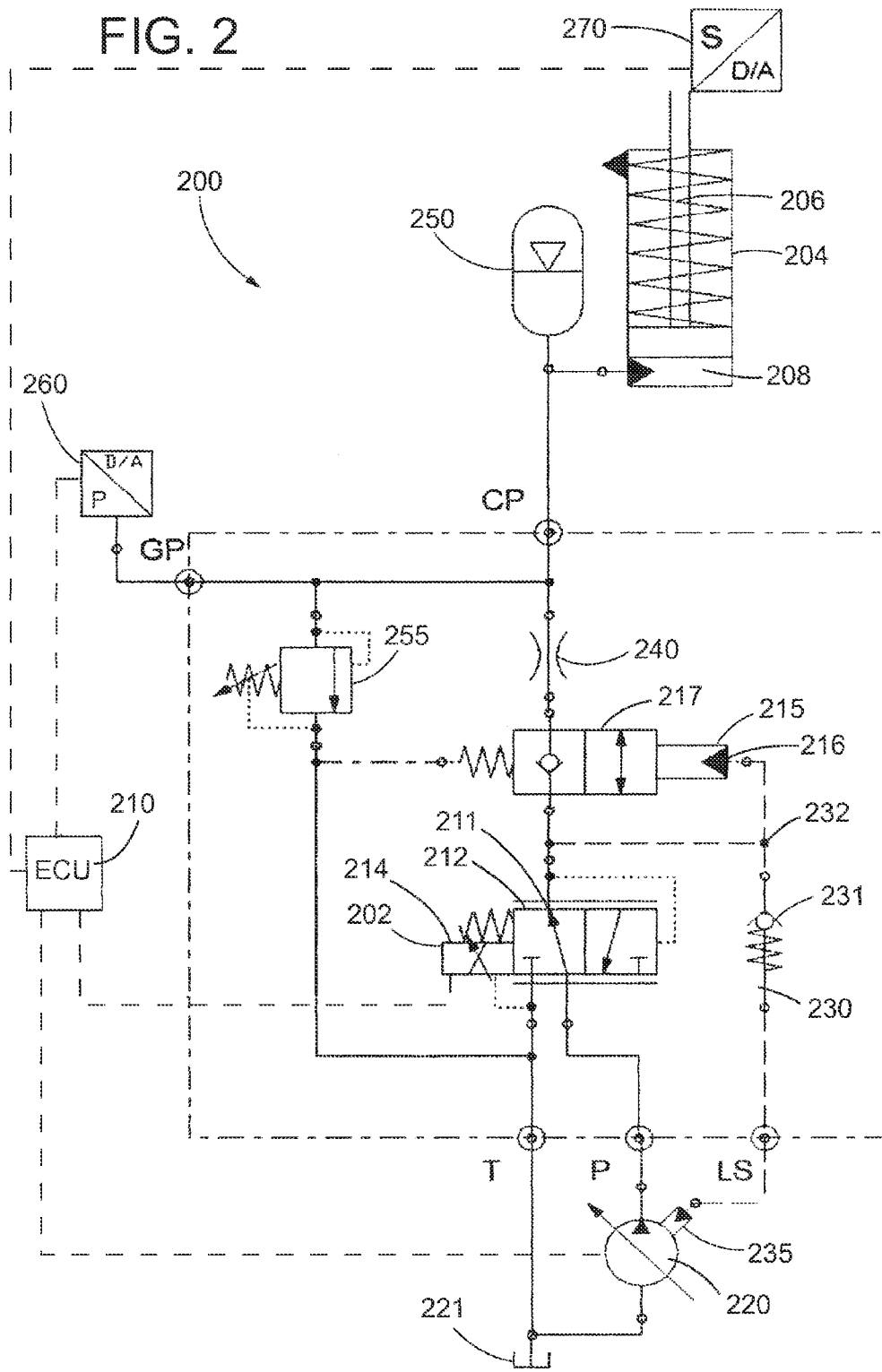
FIG. 2 is a schematic view of an embodiment of a hydraulic circuit in accordance with principles of the present disclosure, illustrating a single-acting system.

Referring to FIG. 2 an embodiment of a hydraulic circuit 200 constructed in accordance with principles of the present disclosure is shown. The hydraulic circuit 200 is adapted for a single-acting suspension system. In the hydraulic circuit 200 of FIG. 2, the solenoid-operated two way/two position poppet valve 115 of the hydraulic circuit 100 of FIG. 1 is omitted. The hydraulic circuit 200 includes a piloted logic element 215 in operative cooperation with a pressure-reducing/-relieving valve 202. The hydraulic circuit 200 of FIG. 2 also includes a suspension cylinder, a controller or electronic control unit (ECU) 210, a variable displacement pump 220, a tank 221, a load-sense check valve 231, an orifice 240, an accumulator 250, a pressure relief valve 255, a pressure sensor 260, and a position sensor 270.

The variable displacement pump 220 is adapted to provide a source of pressurized fluid, and the tank 221 is adapted to hold a reservoir of fluid. The tank 221 is in fluid communication with the pump 220 such that the pump 220 can selectively draw fluid from the tank 221 for providing the source of pressurized fluid. The pump 220 and the tank 221 are both in selective fluid communication with the control valve 202. A load sense line 230 extends between the pump 220 and the piloted logic element 215. The tank 221 is in selective fluid communication with the pressure relief valve 255.

The suspension cylinder 204 is in selective fluid communication with the pump 220 and the tank 221. The control valve 202, the piloted logic element 215, and the orifice 240 are interposed between the pump 220 and the suspension cylinder 204. The control valve 202 and the piloted logic element 215 are adapted to selectively fluidly connect the suspension cylinder 204 to the pump 220 and the tank 221. The suspension cylinder 204 includes a reciprocally movable cylinder rod 206 and defines a chamber 208 therein adapted to receive pressurized fluid.

The pressure sensor 260 can be configured to sense the pressure in the chamber 208 (piston-side) of the cylinder 204. The position sensor 270 can be operably arranged with the cylinder rod 206 and adapted to detect the position of the cylinder rod 206 over its stroke between a retracted position and an extended position.

The proportional pressure-reducing/-relief control valve 202 is in electrical communication with the controller 210 and in selective fluid communication with the pump 220 and the tank 221. The control valve 202 includes a spool 212 reciprocally movable over a range of travel between at least a pump flow position in which the pump 220 and a control port 211 of the control valve 202 are in fluid communication with each other and a tank flow position in which the tank 221 and the control port 211 of the control valve 202 are in fluid communication with each other. The control valve 202 is adapted such that the spool 212 moves in response to a control signal sent to a coil assembly 214 of the control valve 202 received from the controller 210. The control valve 202 can include a coil 214 which is adapted to selectively move the spool 212. In embodiments, the control valve 202 can be biased to the pump flow position.

The piloted logic element 215 can be adapted to selectively maintain the cylinder rod in its position when the control valve 202 is de-energized. The piloted logic element 215 is in fluid communication with and interposed between the control valve 202 and the suspension cylinder 204. The logic element 215 includes a poppet 217 selectively movable between a through-flow position in which fluid can flow in either direction between the chamber 208 of the suspension cylinder 204 and the control port 211 of the control valve 202 and a blocked position in which fluid is prevented from flowing out of the chamber 208 of the suspension cylinder 204 to the control port 211 of the control valve 202. In embodiments, the logic element 215 is constructed such that fluid can flow from the control port 211 of the control valve to the chamber 208 of the suspension cylinder when the poppet 217 is in the blocked position. The illustrated logic element 215 is biased to the blocked position. The logic element 215 includes a pilot port 216 and is adapted to move from the blocking position to the through-flow position when a pressure at the pilot port 216 exceeds a predetermined value, referred to as a "crack" pressure. The pilot port 216 is in fluid communication with the control port 211 of the control valve 202.

The load sense line 230 is adapted to provide a load sense signal to the pump 220. The pump 220 is adapted to vary a flow of pressurized fluid in response to the load sense signal to generate a desired flow to the control valve 202. The load sense line 230 is in fluid communication with the control port 211 of the pressure-reducing/-relieving control valve 202, the piloted logic element 215, and the pump 220 through a load sense port 235. The load sense line 230 includes the load-sense check valve 231, which is adapted to prevent a flow of fluid from the pump 220 to the control valve 202 or the logic element 215 but to allow a flow of fluid from a pilot junction 232 along the load sense line 230 to the pump 220.

In embodiments, the orifice 240 can be disposed between the logic element 215 and the chamber 208 of the suspension cylinder 204. The orifice 240 can be adapted to control a rate of flow of pressurized fluid to and from the chamber 208 of the suspension cylinder 204 to allow additional tuning of the speed at which the cylinder rod 206 reciprocally extends and retracts.

The accumulator 250 can be placed in fluid communication with and interposed between the piloted logic element 215 and the suspension cylinder 204. In embodiments, the accumulator 250 can be configured to reduce the rate of pressure increase as the cylinder rod 206 reciprocally strokes.

The relief valve 255 can be provided to protect the suspension accumulator 250 in fluid communication with the suspension cylinder 204 and the suspension cylinder 204 itself against high pressure peaks. The relief valve 255 is in fluid communication with the tank 221 and in parallel fluid relationship with the suspension cylinder 204, the accumulator 250, and the piloted logic element 215. The relief valve 255 can be adapted such that a pressurized fluid exceeding a predetermined threshold is diverted away from the accumulator 250 and the suspension cylinder 204 to the tank 221.

The ECU 210 can be provided to operate the circuit 200. In embodiments, the ECU 210 can comprise any suitable controller known to those skilled in the art. The controller 210 can be in electrical communication with one or more sensors, such as the pressure sensor 260 and/or the position sensor 270 to obtain operational information regarding the condition of the circuit 200 to help the controller 210 operate. The ECU 210 can be used to selectively provide current to the coil assembly 214 of the control valve 202 based on computer-readable operational logic stored on a non-transitory computer readable medium accessed by the processor of the controller 210.

In embodiments, the control valve 202 can be used to control the single-acting suspension cylinder 204. By increasing or decreasing the control pressure of the control valve 202, the cylinder rod 206 can be extended or retracted. If the pressure setting of the control valve 202 is held constant, the cylinder rod 206 can remain fixed in place.

In embodiments, a hydraulic manifold can be used to control the position of the suspension cylinder 204. When the load on the cylinder 204 changes, the position will change and then the suspension stroke in one direction will be decreased. Therefore, the ECU 210 can be adapted to control the cylinder 204 back to its nominal position such that it has the maximum suspension stroke available. As soon as the control valve 202 is operated (e.g., control current to the coil 214 is higher than the offset), the valve 202 is controlling a pressure at the pilot port 216 of the logic element 215. The logic element 215 opens in response to the pilot pressure, thereby allowing flow to or from the cylinder 204. Furthermore, a load sense signal is sent through the load-sense check valve 230 to the load-sense port 235 of the pump 220 which is adapted to generate the required pressure/flow.

If the pressure controlled with the pressure-reducing/-relieving control valve 202 is lower than the pressure in the chamber 208 of the cylinder 204 but higher than the crack pressure of the logic element 215, the logic element 215 is in the through-flow position and fluid in the chamber 208 of the suspension cylinder 204 drains therefrom, thereby retracting the cylinder rod 206 of the cylinder 204. If the pressure controlled with the pressure-reducing/-relieving valve 202 is higher than the pressure in the cylinder 204 and the crack pressure of the logic element 215, the logic element 215 is in the through-flow position and fluid flows from the pump 220 to the chamber 208 of the suspension cylinder 204, thereby extending the cylinder rod 206 of the cylinder 204.

As soon as the reference position is reached, the control current for the coil 214 of the control valve 202 can be set to zero, and the logic element 215 closes in response to the pilot pressure dropping below the crack pressure of the logic element 215 such that the poppet 217 moves to the blocked position. With the logic element 215 closed, the position of the cylinder rod 206 of the cylinder 204 is maintained until the load changes.

In one configuration, when the digital controller output of the controller 210 is switched off, no current is applied to the pressure-reducing/-relieving control valve 202, and the controlled pressure is lower than the crack pressure setting of the logic element 215. The logic element 215 is closed, and there is no load sense signal through the load-sense check valve 230 in the load sense line 231 in communication with the pump 220.

Figure 3:
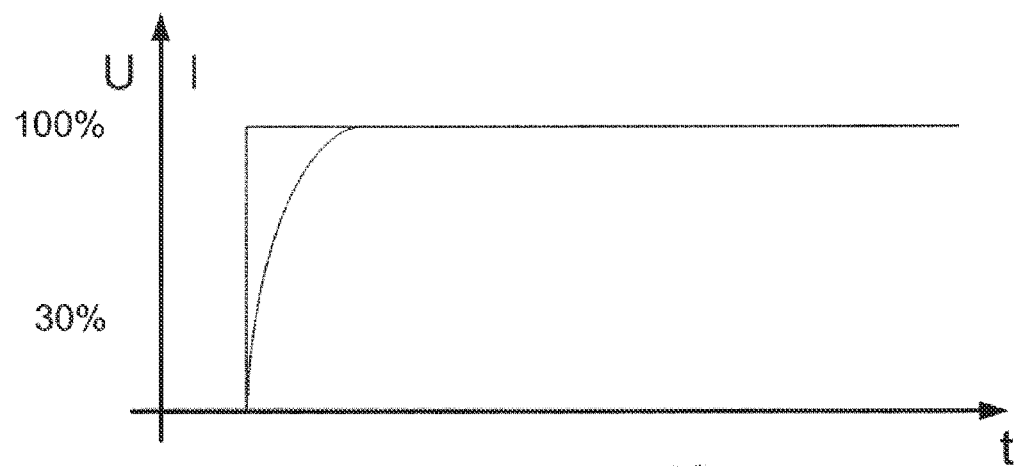
FIG. 3 is a graph of an illustrative controller digital voltage output (U) and corresponding current (I) to control valve versus time (t) for a single-acting system in accordance with principles of the present disclosure, illustrating a controller output in a condition referred to as "on-high."

An operative condition referred to as "on-high" is shown in FIG. 3. When the output of the digital controller 210 is switched to an operative condition referred to as "on-high," the maximum current is applied to the solenoid assembly 214 of the pressure-reducing/-relieving control valve 202, resulting in the maximum pressure setting of the control valve 202 at the control port. A fluid region upstream of the logic element 215 relative to the suspension cylinder 204 (in the illustrated embodiment, the pilot port 216) is in fluid communication with the control port 211 of the control valve 202, and the poppet 217 of the logic element 215 moves to the through-flow position when the pressure at the fluid region upstream of the logic element 215 exceeds a predetermined crack pressure.

The load sense signal sensed at the control port 211 of the pressure-reducing/-relieving control valve 202 causes the pump 220 to increase the supply pressure to the pressure-reducing/-relieving control valve 202 to meet the pressure requirements of the load. As fluid flows from the control port 211 of the pressure-reducing/-relieving control valve 202 and through the logic element 215, the cylinder rod 206 will extend. In embodiments, the position sensor 270 can be used to detect the position of the cylinder rod 206, and/or the pressure sensor 260 can be used to detect the pressure in the piston-side of the suspension cylinder 204 (the chamber 208). The position signal and/or the pressure signal generated by the respective sensor 270, 260 can be sent to the ECU 210 which is adapted to use the signal(s) to control the operation of the control vale 202 and/or the pump 220.

When the reference position or pressure is reached, the digital controller output of the ECU 210 is switched off again. This causes the pressure at the control port 211 of the proportional pressure-reducing/-relieving control valve 202 to drop below the crack pressure of the logic element 215. The logic element 215 closes (the poppet 217 moves back to the blocking position) and holds the pressure in the piston-side of the cylinder 204.

Figure 4:
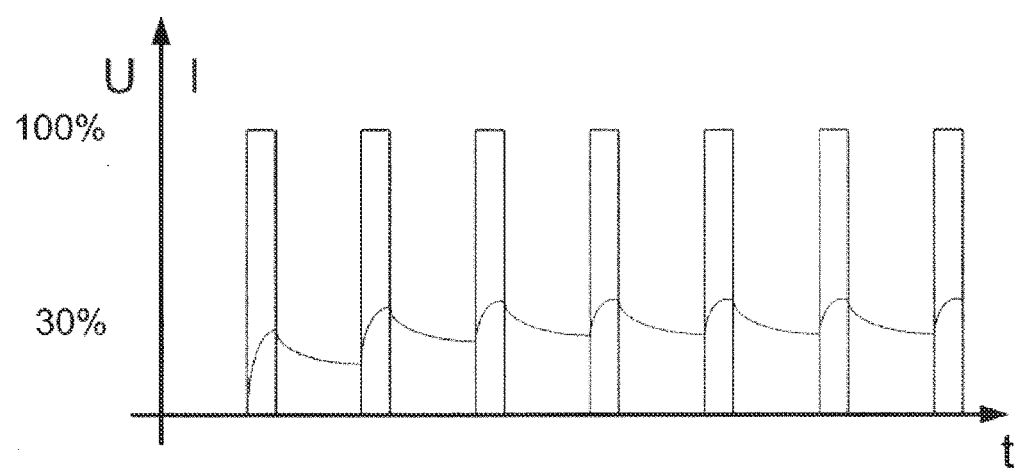
FIG. 4 is a graph of another illustrative controller digital voltage output (U) and corresponding current (I) to control valve versus time (t) for a single-acting system in accordance with principles of the present disclosure, illustrating a controller output in a condition referred to as "on-low."

To retract the position of the cylinder rod 206 or to reduce the pressure in the piston-side of the cylinder 204, the digital controller output of the ECU 210 can be switched to a condition called "On-low," as shown in FIG. 4. The graph in FIG. 4 illustrates the controller output switching between on and off states in a defined cycle time. Due to the inductance of the coil circuit, the current which is applied to the control valve 202 oscillates at about 30% percent of the maximum current, which would have been reached if the output is permanently switched on (see FIG. 3).

The ECU 210 can be adjusted to selectively turn the digital controller output on and off for a predetermined cycle time. For example, in one arrangement, the ECU 210 can vary the cycle time such that the output can be alternately switched on for x cycles, then switched off for 2x cycles, then switched on for x cycles, switched off for 2x cycles and so on, thereby creating a pseudo pulse-width modulation (PWM) control current. In some embodiments, x can be equal to about 1, but other time ratios can be used in other embodiments.

The current applied to the coil 214 of the pressure-reducing/-relieving control valve 202 to retract the cylinder rod 206 of the cylinder 204 or lower the piston-side pressure of the cylinder 204 is shown in FIG. 4. With a low current applied to the pressure-reducing/-relieving valve 202, the pressure sensed by the logic element 215 is slightly higher than the crack pressure which is required to open the logic element 215. The logic element 215 will open. Since the pressure in the piston-side of the cylinder 204 is higher than the pressure controlled with the pressure-reducing/-relieving control valve 202, the hydraulic oil will flow from the cylinder 204 through the orifice 240, through the logic element 215, and through the pressure-reducing/-relieving control valve 202 in relieving mode to the tank 221. This flow of hydraulic oil from the cylinder 204 to the tank 221 will continue as long as the controller output is in this described "On-low" state or until the pressure in the cylinder 204 reaches the pressure setting of the proportional pressure-reducing/-relieving control valve 202.

Figure 5:
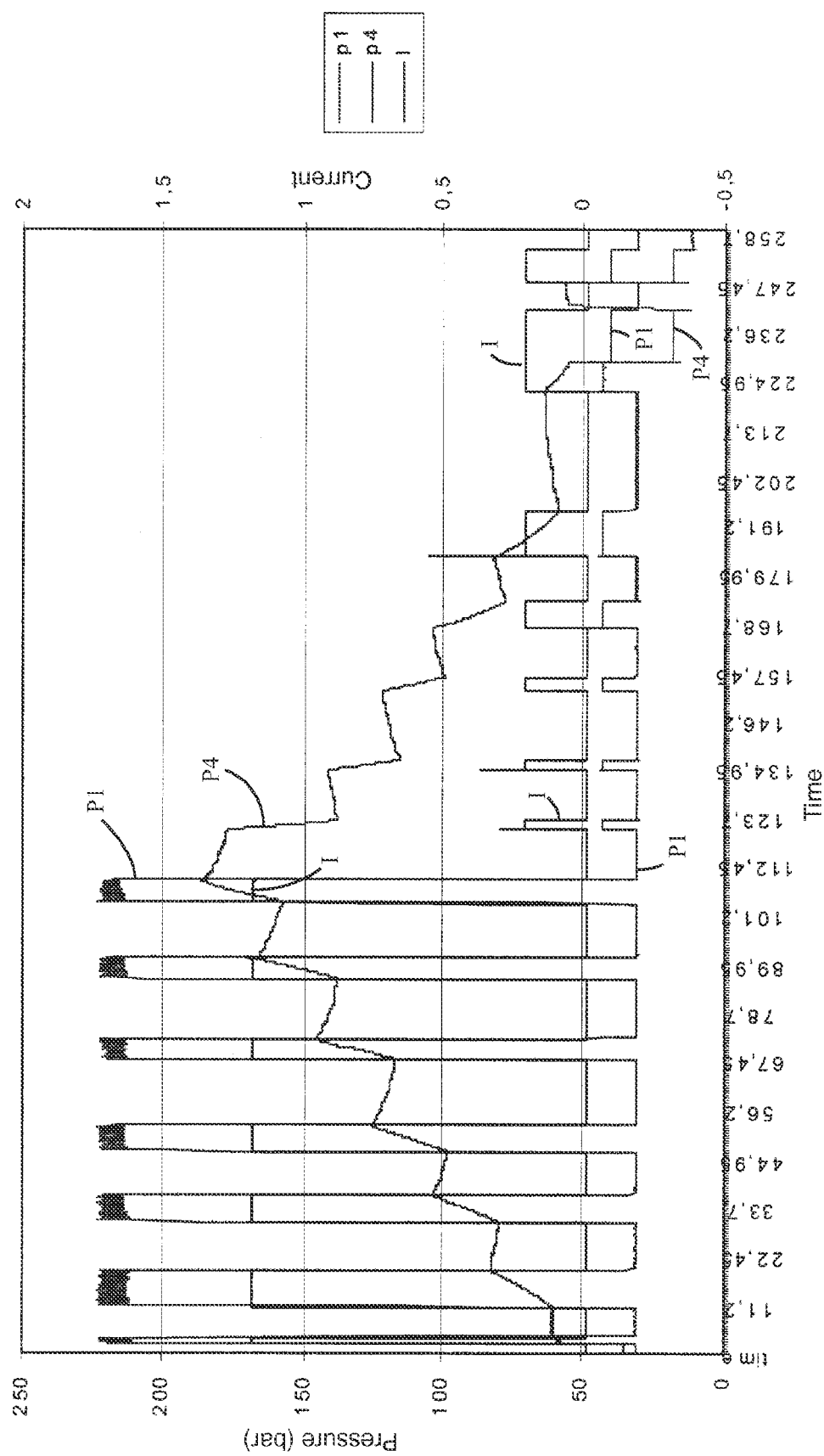
FIG. 5 is a graph of illustrative valve settings versus time for a single-acting system in accordance with principles of the present disclosure, illustrating the control pressure between a proportional pressure-reducing/-relieving valve and a logic element valve, the pressure in a cylinder, and the current to the proportional pressure-reducing/-relieving valve over time.

Referring to FIG. 5, an example of the control pressure, cylinder pressure, and proportional pressure-reducing/-relieving control valve current over time for a single-acting system similar to the circuit 200 of FIG. 2 is shown. P1 is the control pressure between the proportional pressure-reducing/-relieving control valve 202 and the logic element 215. P4 is the pressure of the cylinder 204. I is the current to the coil 214 of the proportional pressure-reducing/-relieving control valve 202.

Figure 6:
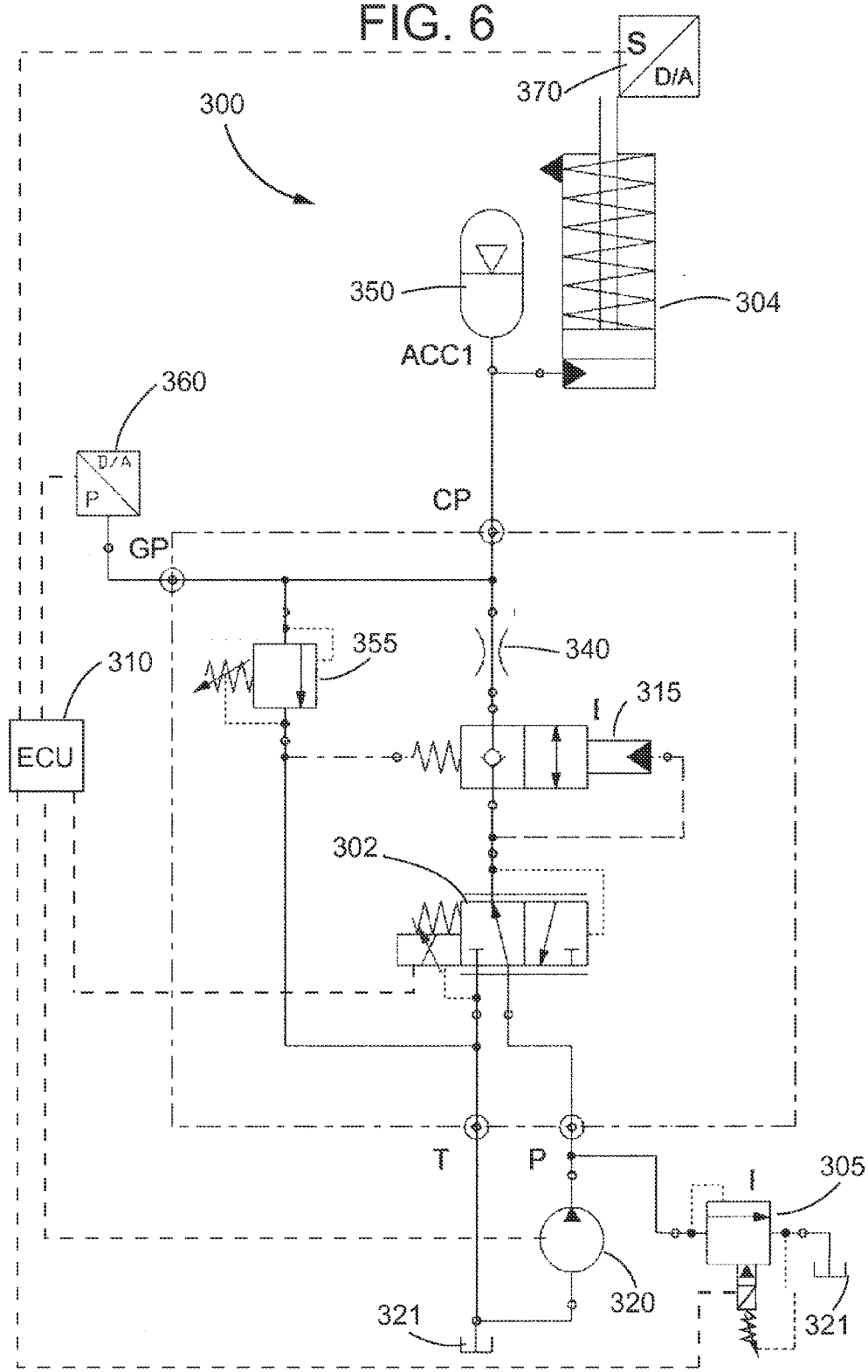
FIG. 6 is a schematic view of an embodiment of a hydraulic circuit in accordance with principles of the present disclosure, illustrating a single-acting system with a constant pump.

Referring to FIG. 6, another embodiment of a hydraulic circuit 300 for a single-acting system constructed in accordance with principles of the present disclosure is shown. The hydraulic circuit 300 includes a pressure-reducing/-relieving control valve 302, a suspension cylinder 304, a controller 310, a piloted logic element 315, a constant flow pump 320, a tank 321, an orifice 340, an accumulator 350, a pressure relief valve 355, a pressure sensor 360, and a position sensor 370.

The piloted logic element 315 is in operative cooperation with the pressure-reducing/-relieving valve 302. The proportional pressure-reducing/-relief control valve 302 is in electrical communication with the controller 310 and in selective fluid communication with the pump 320. The logic element 315 is in fluid communication with and interposed between the control valve 302 and the suspension cylinder 304. These components can operate as explained above to control the cylinder 304.

The constant flow pump 320 is adapted to provide a constant flow of pressurized fluid. In this case, the circuit 300 does not include the load sense function or the hydraulic load sense line 230 including the check valve 231 as is shown in the hydraulic circuit 200 of FIG. 2. To improve hydraulic efficiency, the circuit 300 of FIG. 6 can include a solenoid relief valve 305 or an unloading pressure compensator interposed between the constant flow pump 320 and the control valve 302. The solenoid relief valve 305 can be in electrical communication with the controller 310 such that the ECU 310 can be used to control its operation. The construction and functionality of the hydraulic circuit 300 of FIG. 6 can be similar in other respects to the hydraulic circuit 200 of FIG. 2.

Figure 7:
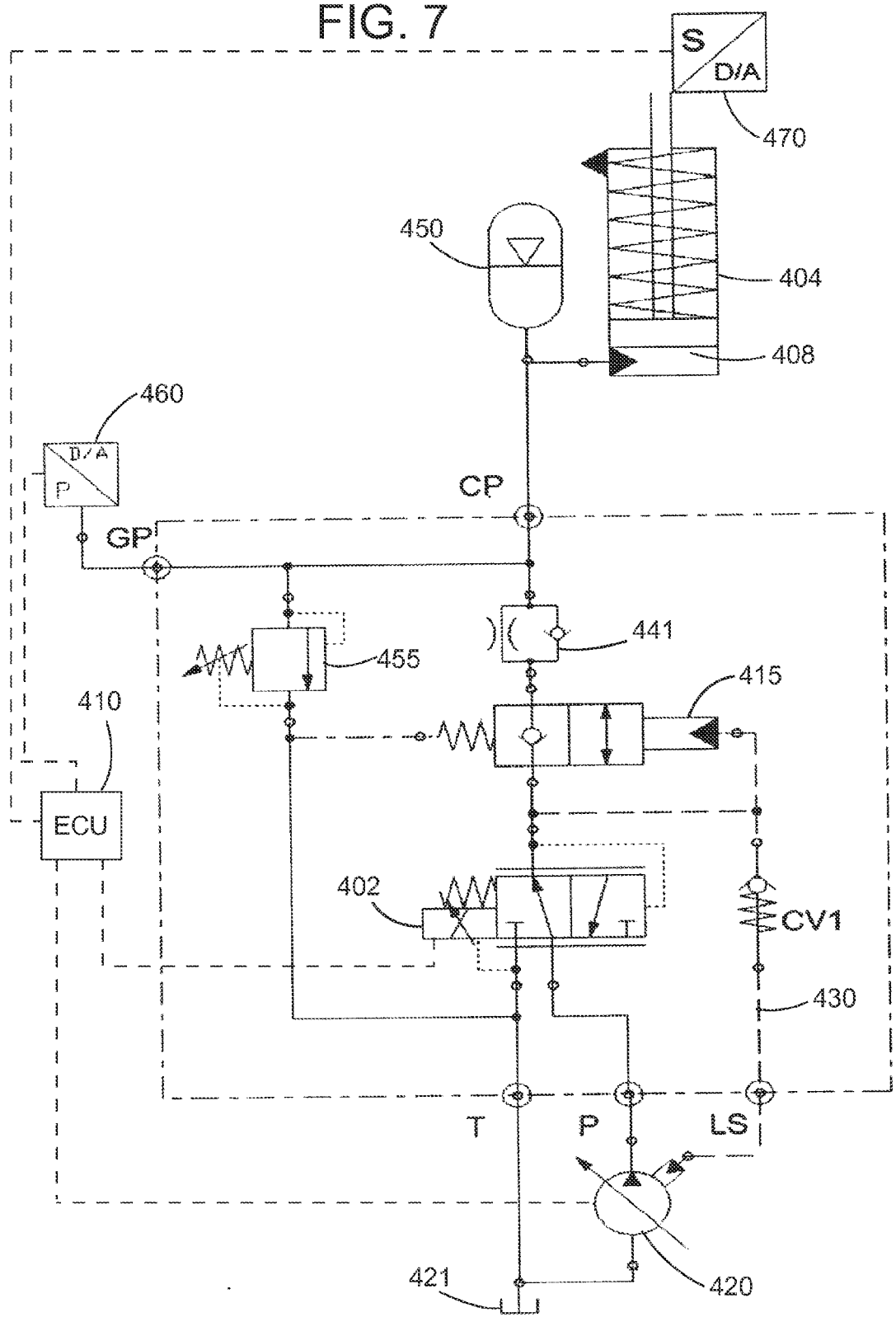
FIG. 7 is a schematic view of another embodiment of a hydraulic circuit in accordance with principles of the present disclosure, illustrating a single-acting system with a one-way restriction orifice.

Referring to FIG. 7, another embodiment of a hydraulic circuit 400 for a single-acting system constructed in accordance with principles of the present disclosure is shown. The hydraulic circuit 400 includes a pressure-reducing/-relieving valve 402, a suspension cylinder 404, a controller 410, a piloted logic element 415, a variable displacement pump 420 with a load sense line 430, a tank 421, an accumulator 450, a pressure relief valve 455, a pressure sensor 460, and a position sensor 470.

The piloted logic element 415 is in operative cooperation with the pressure-reducing/-relieving valve 402. The proportional pressure-reducing/-relief control valve 402 is in electrical communication with the controller 410 and in selective fluid communication with the pump 420. The logic element 415 is in fluid communication with and interposed between the control valve 402 and the suspension cylinder 404. These components can operate as explained above to control the cylinder 404.

The circuit 400 of FIG. 7 includes a one-way restrictor 441 rather than an orifice 240 as found in the hydraulic circuit 200 of FIG. 2. The one-way restrictor 441 is disposed between the logic element 415 and the chamber 408 of the suspension cylinder 404. In embodiments, the one-way restrictor 441 is adapted to control a rate of flow of pressurized fluid in one direction between the piloted logic element 415 and the cylinder 404, either to or from the chamber 408 of the suspension cylinder 404.

In the illustrated embodiment, the one-way restrictor 441 does not restrict the flow of fluid from the piloted logic element 415 to the cylinder 404, but restricts the flow of fluid from the cylinder 404 to the piloted logic element 415. By using the one-way restrictor 441 as shown, the cylinder rod 406 of the suspension cylinder 404 can be extended very quickly while providing a slow controlled retraction (alternatively, the cylinder rod 406 could be retracted very quickly while providing slow, controlled extension using a one-way restrictor arranged in the opposite fashion). This can be beneficial in special situations involving front-axle suspension systems. The construction and function of the hydraulic circuit 400 of FIG. 7 can be similar in other respects to the hydraulic circuit 200 of FIG. 2.

Figure 8:
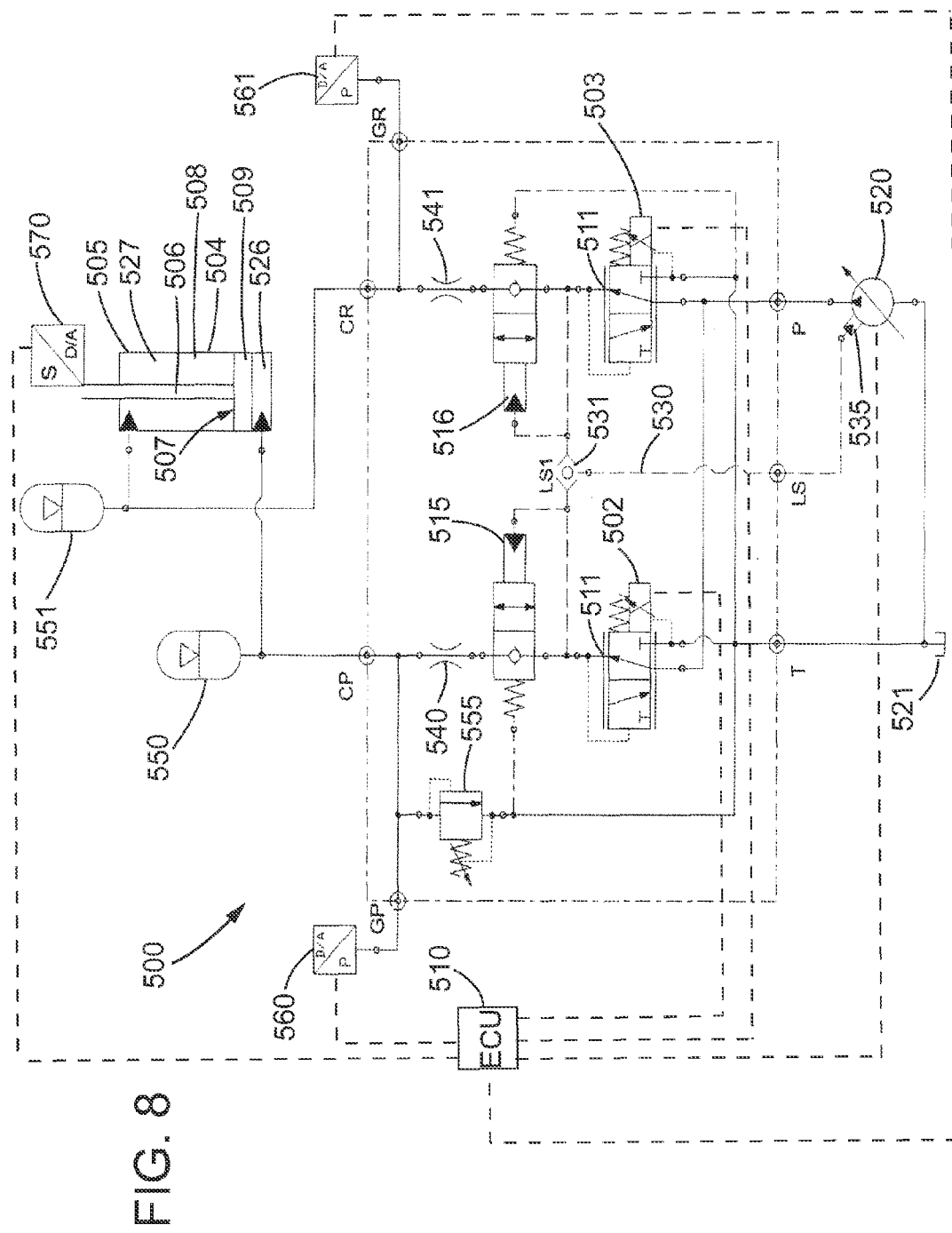
FIG. 8 is a schematic view of an embodiment of a hydraulic circuit in accordance with principles of the present disclosure, illustrating a double-acting system.

Referring to FIG. 8, an embodiment of a hydraulic circuit 500 constructed in accordance with principles of the present disclosure for a double-acting suspension system is shown. The hydraulic circuit 500 of FIG. 8 includes a piston-side pressure-reducing/-relieving control valve 502, a rod-side pressure-reducing/-relieving control valve 503, a suspension cylinder 504, a controller 510, a pair of piloted logic elements 515, 516, a variable displacement pump 520 with a load sense line 530, a tank 521, a piston-side orifice 540, a rod-side orifice 541, a piston-side accumulator 550, a rod-side accumulator 551, a pressure relief valve 555, a piston-side pressure sensor 560, a rod-side pressure sensor 561, and a position sensor 570.

The double-acting suspension system 500 uses a piston side 526 and a rod side 527 of a chamber 508 of the suspension cylinder 504 for the suspension function. The suspension cylinder 504 includes a body 505 and a piston assembly 507 disposed within the body 505 that is reciprocally movable over a range of travel between a retracted position and an extended position. The piston assembly 507 includes a piston 509 and a rod 506, at least a portion of which extends from the body 505. The body 505 defines the piston-side chamber 526 and the rod-side chamber 527.

The load sense pump 520 can be adapted to provide a source of pressurized hydraulic fluid to both the piston-side pressure-reducing/-relieving control valve 502 and the rod-side pressure-reducing/-relieving control valve 503, which are all in electrical communication with the ECU 510. The control valves 502, 503 are each in turn associated with the piloted logic elements 515, 516, the orifices 540, 541, and the accumulators 550, 551, respectively.

The load sense line 530 fluidly connects the control port 511 of the piston-side pressure-reducing/-relieving control valve 502 and its associated piloted logic element 515 with the pump 520 through a resolver 531. The load sense line 530 also fluidly connects the control port 511 of the rod-side pressure-reducing/-relieving control valve 503 and its associated piloted logic element 516 with the pump 520 through the resolver 531. The load sense line 530 is adapted to provide a load sense signal to the pump 520 through a load sense port 535. The pump 520 is adapted to vary a flow of pressurized fluid in response to the load sense signal to generate a desired flow to the control valve 202.

The pair of orifices 540, 541 is respectively disposed between the piston-side logic element 515 and the cylinder 504 and between the rod-side logic element 516 and the cylinder 504. Both sides 526, 527 of the cylinder chamber 508 are independently connected to the respective accumulators 550, 551. The position control of the cylinder rod 506 can be performed by increasing or decreasing the oil volume in the piston side 526 of the cylinder 504. The rod side 527 of the cylinder 504 can be pressurized with a constant or variable pressure. The illustrated circuit 500 of FIG. 8 provides a variable rod side pressure with the disclosed circuit concept.

The function of the circuit 500 of FIG. 8 is similar to the single acting suspension circuit 200 of FIG. 2. The position control (cylinder piston side 526) works in a manner similar to that described above in connection with a single-acting system, such as in FIG. 2. For the pressure control in the cylinder rod side 527, several scenarios are possible. The pressure in the cylinder rod side 527 can be controlled by using the rod-side pressure sensor 561 to detect the pressure in the rod side 527 of the cylinder 504. The rod-side proportional pressure-reducing/-relieving control valve 503 can be operated using a closed control loop with a feedback or feed-forward control loop such as a PID-controller or equivalent algorithm to control the pressure to the reference value. The pressure in the cylinder rod side 527 can be increased and decreased in a similar manner as the position of the cylinder rod 506 is controlled. If the pressure controlled with the rod-side proportional pressure-reducing/-relieving control valve 503 is lower than the pressure in the rod side 527 of the cylinder 504 but higher than the crack pressure of the rod-side logic element 516, the pressure in the rod side 527 of the cylinder 504 will be reduced. If the pressure controlled with the rod-side proportional pressure-reducing/-relieving control valve 503 is higher than the pressure in the rod-side 527 of the cylinder 504, the pressure in the rod side 527 of the cylinder 504 will be increased.

A second option to control the pressure in the cylinder rod side 527 is to set the current to the rod-side proportional pressure-reducing/-relieving control valve 503 to regulate a desired pressure according to the characteristic curve of the control valve 503 during cylinder piston side 526 adjustments. One way this can be accomplished is by using the ECU 510 with a PWM-output with current feedback to control the current to the rod-side proportional pressure-reducing/-relieving control valve 503.

A third option (also used for position control) to control the pressure in the cylinder rod side 527 is to use the rod-side proportional pressure-reducing/-relieving control valve 503 controlled by a digital output from the controller 510 to provide no output, "on-low", or "on-high" current to the control valve as previously described above. A double-acting system can be configured to replicate this control scheme to control the piston-side pressure-reducing/-relieving control valve 502 and the rod-side proportional pressure-reducing/-relieving control valve 503. This method is beneficial, since all ECU's may not have free PWM outputs available. The rod-side pressure sensor 561 can be used to detect if the pressure in the rod-side 527 of the cylinder 504 should decrease, increase, or if it is in the acceptable range. The pressure is then adjusted using either an "on-low" current or "on-high" current or maintained with no current to the valve. The discussion of the operation of the circuit 200 of FIG. 2 is referred to for further details, which are applicable to the operation of the rod-side 527 of the circuit 500 of FIG. 8, as well. In a double-acting system, the rod and piston side 527, 526 of the cylinder 504 can be controlled independently and concurrently.

Figure 9:
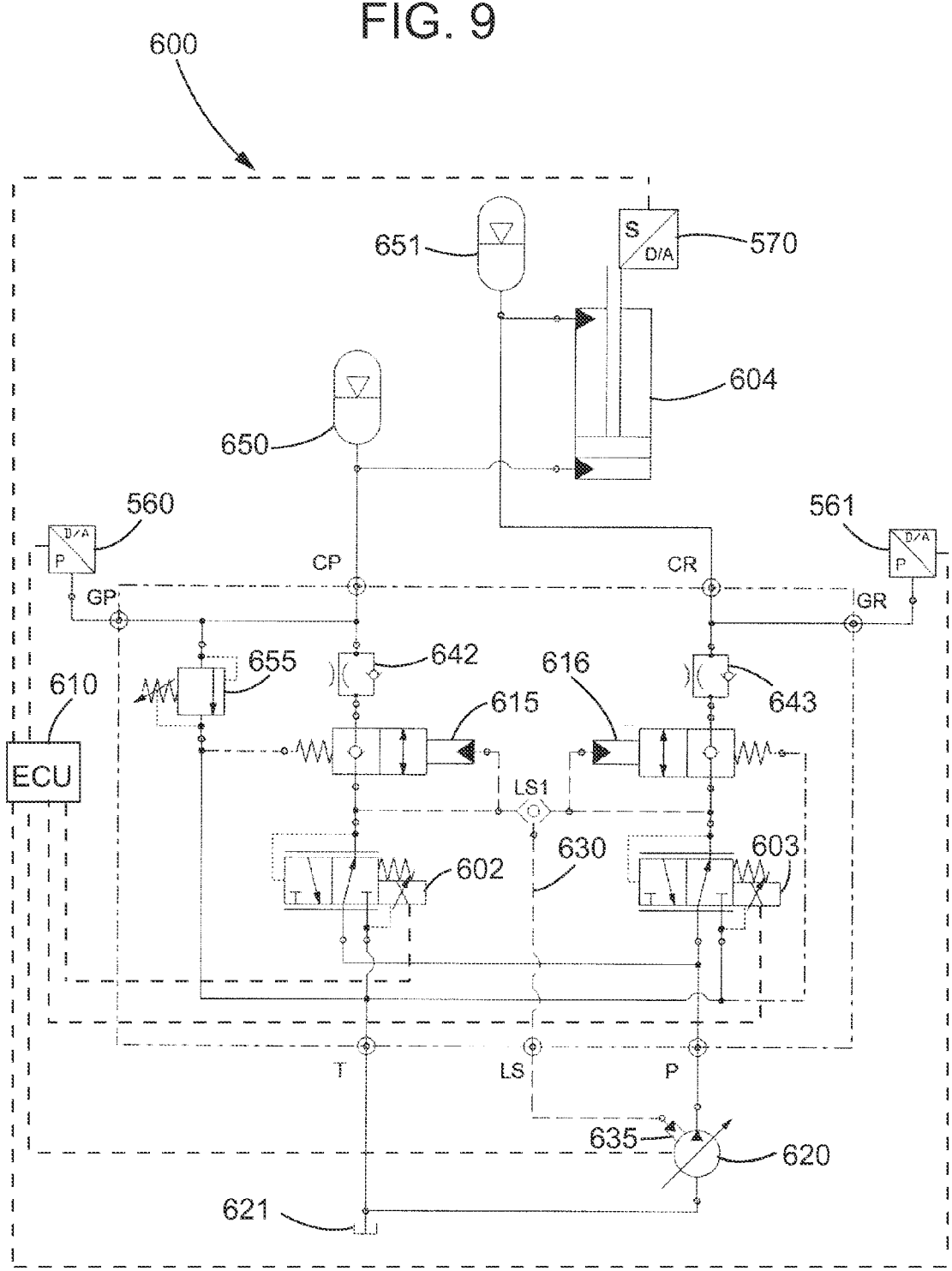
FIG. 9 is a schematic view of an embodiment of a hydraulic circuit in accordance with principles of the present disclosure, illustrating a double-acting system with a pair of one-way restriction orifices.

Referring to FIG. 9, another embodiment of a hydraulic circuit 600 constructed in accordance with principles of the present disclosure is shown, which is a double-acting system similar to the circuit 500 of FIG. 8. The hydraulic circuit 600 of FIG. 9 includes a piston-side pressure-reducing/-relieving control valve 602, a rod-side pressure-reducing/-relieving control valve 603, a suspension cylinder 604, a controller 610, a piston-side piloted logic elements 615, a piston-side piloted logic element 616, a variable displacement pump 620 with a load sense line 630, a tank 621, a piston-side accumulator 650, a rod-side accumulator 651, a pressure relief valve 655, a piston-side pressure sensor 560, a rod-side pressure sensor 561, and a position sensor 570.

The circuit 600 of FIG. 9 is the same as the circuit 500 of FIG. 8 except that the piston-side orifice 540 and the rod-side orifice 541 of the circuit 500 of FIG. 8 are replaced with a pair of one-way restrictor valves 642, 643, respectively. The orifice elements of the one-way restrictor valves 642, 643 can have a different size from each other in some embodiments.

Figure 10:
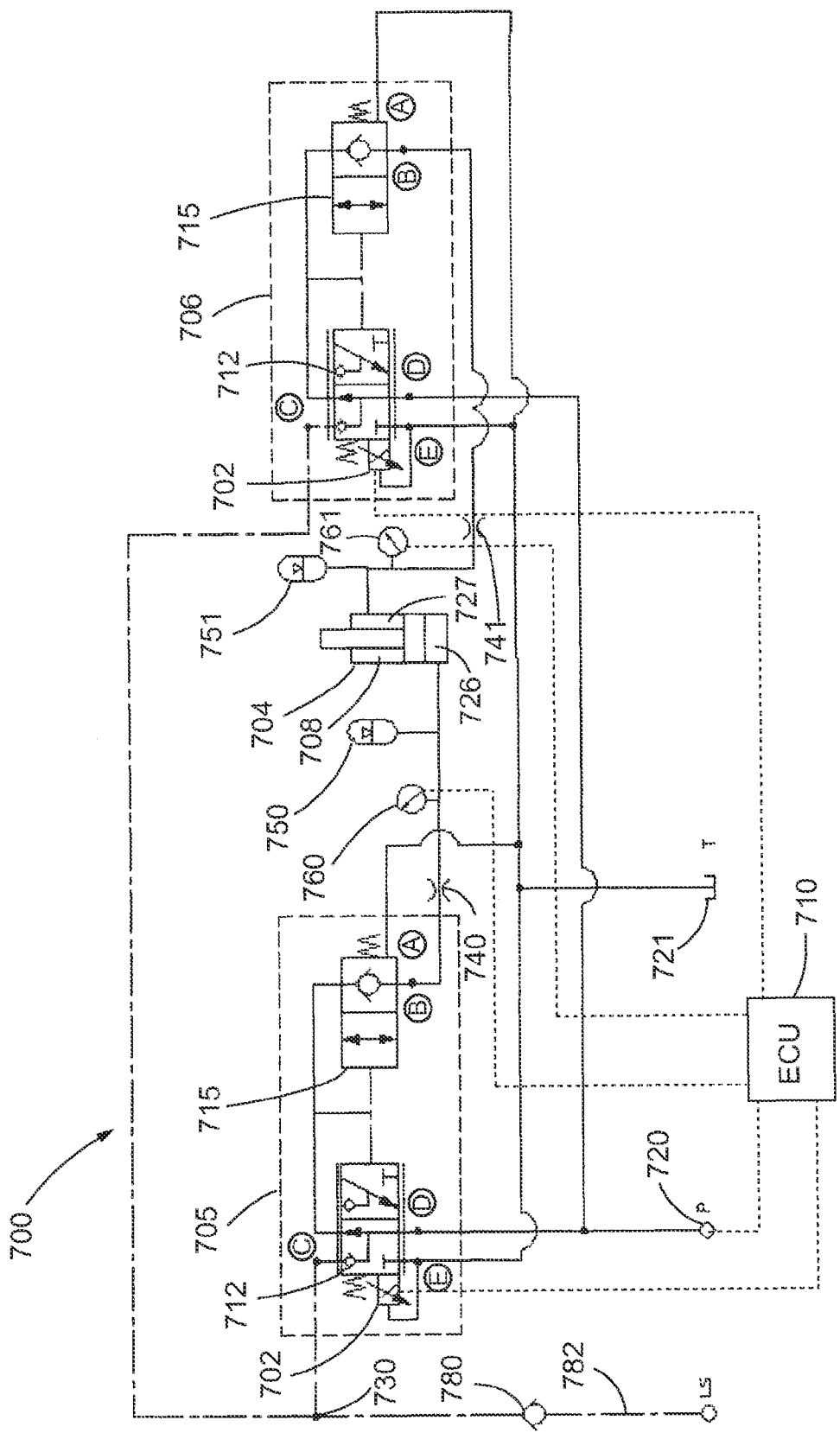
FIG. 10 is a schematic view of another embodiment of a hydraulic circuit in accordance with principles of the present disclosure, illustrating a double-acting system with an embodiment of a multi-functional control valve constructed in accordance with principles of the present disclosure.

Referring to FIG. 10, another embodiment of a hydraulic circuit 700 constructed in accordance with principles of the present disclosure is shown, which is similar to the circuit 500 of FIG. 8. The hydraulic circuit 700 comprises a double-acting suspension system which uses a piston side 726 and a rod side 727 of the chamber 708 of a suspension cylinder 704 for the suspension function. The hydraulic circuit 700 of FIG. 10 includes a piston-side multifunctional cartridge control valve 705, a rod-side multifunctional cartridge control valve 706, the suspension cylinder 704, a controller 710, a variable displacement pump 720 with a load sense line 730, a tank 721, a piston-side orifice 740, a rod-side orifice 741, a piston-side accumulator 750, a rod-side accumulator 751, a piston-side pressure sensor 760, and a rod-side pressure sensor 761.

To obtain a space-saving option, the pair of multifunctional cartridge control valves 705, 706 can be provided, which each integrate a proportional pressure-reducing/-relieving control valve 702, a piloted logic element 715, and a check valve 712 that perform the same function as the corresponding components of the circuit 500 of FIG. 8. For example, the integrated components of the piston-side multifunctional cartridge control valve 705 correspond to the piston-side pressure-reducing/-relieving valve 502, the piston-side logic element 515, and the portion of the resolver 531 in the load sense line 530 configured to provide a load sense signal for the piston-side of the cylinder 504. In embodiments, the orifices 740, 741 can be integrated into each of the multifunctional cartridge control valves 705, 706, respectively.

The variable displacement pump 720 is adapted to provide a source of pressurized fluid, and the tank 721 is adapted to hold a reservoir of fluid. The tank 721 is in fluid communication with the pump 720. The load sense pump 720 can be adapted to provide a source of pressurized hydraulic fluid to both a piston-side multifunctional cartridge control valves 705 and a rod-side multi-functional cartridge control valves 705, which are all in electrical communication with an ECU 710.

The suspension cylinder 704 is in selective fluid communication with the pump 720 via the piston-side multifunctional cartridge control valve 705 and the rod-side multifunctional cartridge control valve 706. The suspension cylinder 704 defines a chamber 708 therein adapted to receive pressurized fluid. The piston-side 726 and the rod-side 727 of the cylinder chamber 708 are independently connected to the piston-side and rod-side accumulators 750, 751 and pressure sensors 760, 761, respectively. The pressure sensors 760, 761 can be disposed between the orifices 740, 741, respectively, and the cylinder 704.

In the circuit 700 of FIG. 10, a load sense check valve 780 can be placed in a common branch 782 of the load sense line 730. The load sense check valve 780 can help to completely unload the load sense pump 720 below the residual pressure of the pressure reducing portion of the multifunctional cartridge control valves 705, 706.

Figure 11:
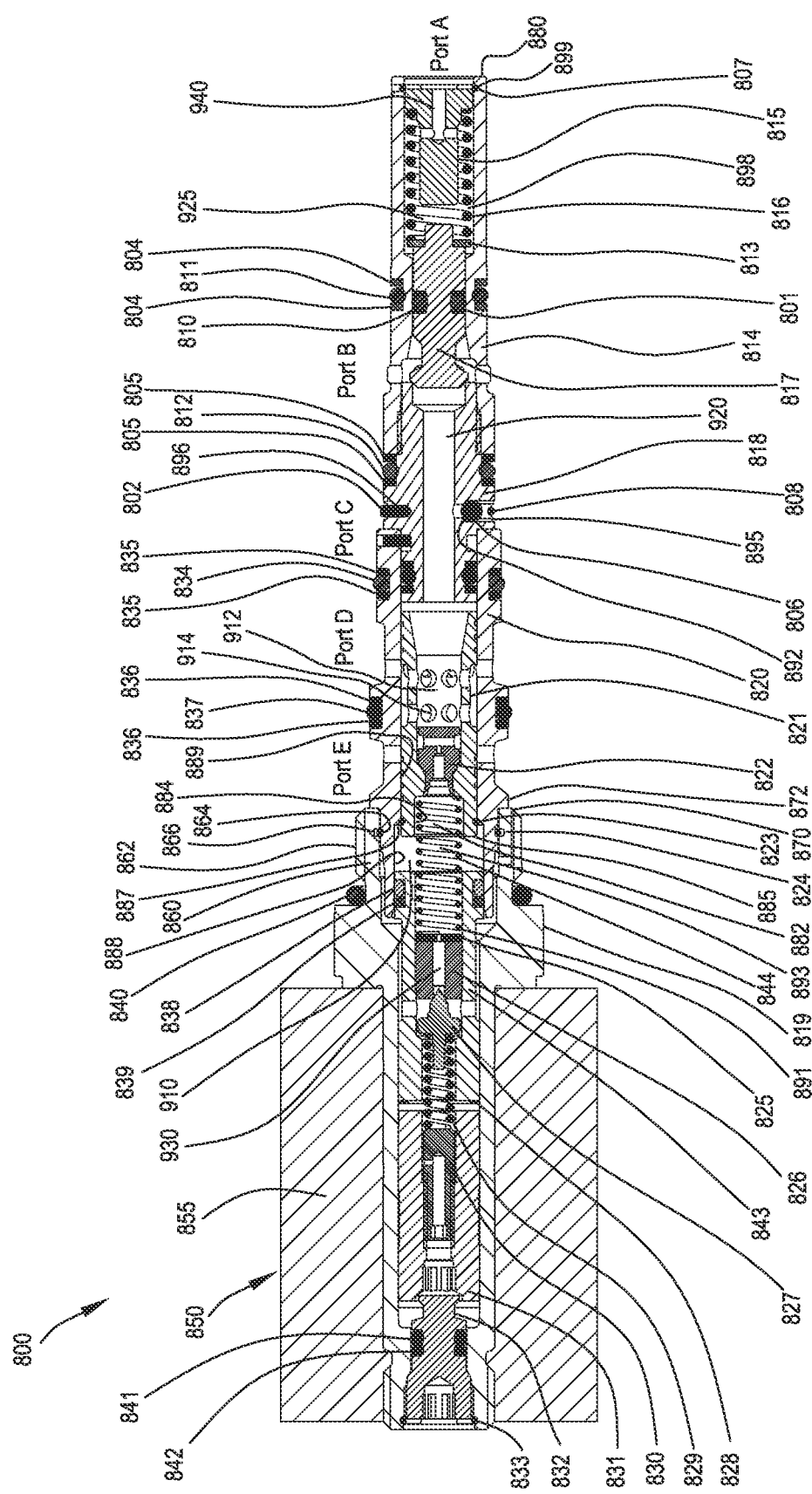
FIG. 11 is an elevational view, in cross section, of an embodiment of a multi-functional control valve constructed in accordance with principles of the present disclosure.

Referring to FIG. 11, an embodiment of a multi-functional cartridge valve 800 constructed in accordance with principles of the present disclosure is shown. The illustrated valve 800 includes a control valve portion, a logic element portion, and a load sense portion contained within a single cartridge arrangement. In embodiments, the cartridge valve 800 can be housed within a suitably configured valve body.

In the illustrated valve 800, an electro-magnetic actuator assembly in the form of a solenoid assembly 850 includes a coil 855, a tube 819, a movable plunger or armature 831, and a pole piece 843. The solenoid 850 has a proportional characteristic of magnetic (attractive) force between the pole piece 843 and the plunger 831 which is proportional to the current applied to the coil 855. The tube 819 can comprise a bi-metallic assembly consisting of magnetically attractive and non-attractive materials. The geometry of the magnetically attractive and non-attractive materials can be configured to determine the magnetic force characteristic of the solenoid 850. A non-magnetic washer 828 between the pole piece 843 and the plunger 831 prevents the plunger 831 from latching to the pole piece 843 via residual magnetism.

A pilot spring 829 transmits the solenoid force to a pilot poppet 827. The equilibrium position of the plunger 831 at a given coil current is determined when the magnetic force balances with the force of the pilot spring 829. An adjusting screw 830 sets the position of the plunger 831 with no current applied to the coil. Turning the adjusting screw 830 in and out of the plunger 831 allows the user to set the desired pressure setting of the valve at a give current.

A threaded plug 832 at the top of the tube 819 can be removed to allow adjustment of the adjusting screw 830 to provide a pressure setting with no current applied to the coil 855. A spring ring 833 can be provided to retain the plug 832 after the valve 800 is set to the desired pressure setting and helps prevents unintended removal of the plug 832. A proximal outer area between the plug 832 and the tube 819 may also be filled with epoxy for further tamper-proof protection, in which case the threaded plug 832 can be adjusted by the manufacturer and then encased with an epoxy. An O-ring 841 and a back-up ring 842 can provided to form a seal between the tube 819 and the plug 832 to help prevent external leakage. A distal portion 860 of the tube 819 includes a threaded external surface 862 adapted to threadingly engage the cavity of a valve body (not shown).

The valve 800 defines five fluid connection ports (Ports A-E) which correspond to those shown for the multifunctional cartridge control valves 705, 706 of the hydraulic circuit 700 of FIG. 10. Port A is disposed along a longitudinal axis of the valve 800 on the distal face end 880 of a logic element cage 814. Ports B-E are located along the outer periphery of the valve housing with fluid connections in the radial direction. The Ports E, D, C, B, A are separated from adjacent Ports by an O-ring 837, 834, 812, 811 and an associated pair of back-up rings 836, 835, 805, 804, respectively, to prevent fluid from leaking from one port to another. In other embodiments, the Ports E, D, C, B, A may be separated by a single molded seal.

The logic element cage 814 defines Ports A and B. A logic element seat 818 defines Port C. A pressure-reducing/-relieving control valve cage 820 defines Ports E and D. An O-ring 840 prevents external leakage proximally from Port E.

A control valve portion can include the control valve cage 820 and a hollow spool 821. The control valve cage 820 defines a longitudinal interior passageway 910, a tank port E, and a pump port D. The tank and pump ports E, D are in communication with the interior passageway 910 of the control valve cage 820. The spool 821 defines a longitudinal spool passageway 912 and a plurality of cross holes 914 radially arranged about the spool 821. The cross holes 914 of the spool 821 are in communication with the spool passageway 912 and the interior passageway 910 of the control valve cage 820. The spool 821 is disposed within the interior passageway 910 of the control valve cage 820 and reciprocally movable over a range of travel between a pump flow position in which the pump port D of the control valve cage 820 is open and the tank port E of the control valve cage 820 is closed and a tank flow position in which the tank port E of the control valve cage 820 is open and the pump port D of the control valve cage 820 is closed. The spool 821 is biased to the pump flow position.

The control valve cage 820 has a "floating" connection with the tube 819 through an oval spring ring 824 that retains the valve cage 820 to the tube 819 when the valve 800 is removed from the cavity of a valve body. The spring ring 824 is trapped in a machined groove 864 provided on the outer diameter of the cage 820 and a corresponding groove 866 on the inner diameter of the tube 819. When the valve 800 is installed in the cavity of a valve body, the "floating" portion of the valve 800 is trapped between the distal face end 870 of the tube 819 and a shoulder 872 of the control valve cage 820 at a proximal outer end of the cavity of the valve body and a distal bottom of the cavity and a distal face end 880 of the logic element cage 814 at the distal bottom of the cavity.

The reciprocally-movable spool 821 is disposed within the control valve cage 820 and is adapted to selectively open and close the flow area at Port D and Port E. A filter core 822 is installed in the spool 821. The filter core 822 is interposed between the radial cross holes 914 of the spool 821 and the orifice 825 of the pilot poppet assembly. The filter core 822 incorporates an orifice hole and restricts the size of particle that can pass between the filter core 822 and the spool 821 before reaching the orifice hole. In embodiments, the filter core 822 can be retained within the spool 821 by a swaging operation that flares an upper lip of the filter core 822 after it is inserted into the spool 821.

A spool bias spring 844 can be provided that is adapted to bias the spool 821 to a position in which the spool 821 occludes Port E. A distal end 882 of the spool bias spring 844 is installed in a blind hole 884 at a proximal end 885 of the spool 821 to urge the spool 821 in a distal direction along the longitudinal axis to a position that closes off Port E (as shown) when the pressure proximally above and distally below the spool 821 is balanced. A spring ring 823, which is installed in a groove at the proximal end 885 of the spool 821, provides a positive stop in the distal direction for the spool 821 when it contacts an angled surface 887 defined between a proximal bore 888 of the cage 820 having a first diameter and a distal bore 889 of the control valve cage 820 having a second diameter which is smaller than the diameter of the proximal bore 888. An O-ring 838 and an associated back-up ring 839 help seal the spool bias spring chamber 893 from Port E.

In embodiments, the electro-magnetic actuator has a pilot poppet assembly that includes the pilot poppet 827, the pilot spring 829 interposed between the armature 831 and the pilot poppet 827, a seat 826 retained within the pole piece 843 and defining a longitudinal bore 930 therethrough, and an orifice 825 interposed between the longitudinal bore 930 and the spool bias spring 844. The orifice 825 is in communication with the spool passageway 912. The pilot spring 829 urges the pilot poppet 827 into sealing engagement with the seat 826 such that the longitudinal bore 930 is occluded until a poppet lifting force is applied in a direction from the orifice toward the pilot spring 829.

A proximal end 891 of the spool bias spring 844 rests against the orifice disc 825 located within the pole piece 843. The orifice disc 825 is engaged with the hardened seat 826. The seat 826 is secured via an interference fit between the seat 826 and the pole piece 843. The seat 826 is further retained from moving proximally by an angled surface, created by the change in diameter, at the proximal end of the seat 826, which makes positive contact with a slight change in diameter of a bore of the pole piece 843. The pilot poppet 827 is engaged with the seat 826 to define a low leakage seal until sufficient pressure is present distally below the seat 826 to lift the pilot poppet 827 off the seat 826 in a proximal direction against the spring force created by the solenoid actuator 850 above.

In embodiments, the valve 800 can include a load sense portion in communication with both the control valve portion and a logic element portion. The illustrated load sense portion includes the logic element seat 818 and a load sense check ball 806.

The logic element seat 818 is interposed between the control valve cage 820 and a logic element cage 814. The logic element seat 818 defines a longitudinal load sense passageway 920 therethrough and a load sense port C, which is in communication with the load sense passageway 920. The load sense passageway 920 is in communication with the spool passageway 912 of the control valve portion and a logic element poppet 817.

The logic element seat 818 has an interference fit with the pressure reducing/relieving control valve cage 820, which is proximally above the logic element seat 818, and the logic element cage 814, which is distally below the logic element seat 818. In other embodiments, the logic element seat 818 can be connected to the two cages 814, 820 via a threaded connection or other mechanical device such as a spring pin or spring ring (not shown).

The logic element seat 818 defines Port C which comprises a load sense port adapted to actuate a load sense pump or other pump control device, and incorporates a reverse-flow check ball 806. The check ball 806 sits against a seat 892 in the radial passage defined in the logic element seat 818 and blocks the flow of hydraulic fluid when the pressure at Port C is higher than the internal valve pressure between the spool 821 and a logic element poppet 817. A spring ring 808, which is installed in a machined groove 895 in the seat 818, holds the check ball 806 in place. A roll pin 802 is inserted into a blind hole 896 in the seat 818 about one hundred eighty degrees away from the check ball seat to fix the rotational position of the spring ring 808.

In embodiments, the valve 800 includes a logic element portion which is in communication with the control valve portion. The illustrated logic element portion includes the logic element cage 814 and the logic element poppet 817. The logic element cage 814 defines a longitudinal interior logic element passageway 925 and a logic element port B, which is in communication with the logic element passageway 925. The logic element passageway 925 is in communication with the spool passageway 912.

The logic element poppet 817 is disposed within the logic element passageway 925 of the logic element cage 814 and reciprocally movable over a range of travel between a blocking position in which the logic element port B of the logic element cage 814 is closed and a logic element through-flow position in which the logic element port B of the logic element cage 814 is open. The logic element poppet 817 is biased to the blocking position such that the logic element poppet 817 remains in the blocking position until a pressure at least equal to a crack pressure is applied to the logic element poppet 817 against the biasing force, thereby unseating the logic element poppet 817 from the blocking position and moving the logic element poppet 817 toward the through-flow position.

The logic element poppet 817 is engaged with the logic element seat 818 via the force of a logic element spring 816. When the pressure between the control valve spool 821 and the logic element poppet 817 causes the force that acts to open the logic element poppet 817 to exceed the force of the logic element spring 816 that acts to close the logic element poppet 817, the logic element poppet 817 lifts off the logic element seat 818, thereby allowing flow to Port B defined by the logic element cage 814. The diameter of the logic element seat 818 matches the bore diameter of the poppet 817 so that pressure at Port B will not act to open the logic element poppet 817.

The second port A can be in fluid isolation with respect to the logic element port B of the logic element cage 814. In the illustrated embodiment, Port B is internally sealed off from Port A by an O-ring 810 and a piston seal 801 on an external surface of the logic element poppet 817. The piston seal 801 provides a running seal between the logic element poppet 817 and the logic element passageway 925 of the logic element cage 814.

A washer 813 mounted to the logic element poppet 817 provides a seat for a proximal end of the logic element spring 816 which provides a bias force on the logic element poppet 817. A spring guide 815 supports the opposing distal end of the spring 816, provides guidance for the logic element spring 816, and hydraulic fluid communication of the logic element spring chamber 898 to Port A. The spring guide 815 defines a passageway 940 therethrough. In the illustrated embodiment, the passageway 940 of the spring guide has a longitudinal segment and a plurality of radial segments in communication with the longitudinal segment. The passageway 940 of the spring guide 815 is in communication with the logic element passageway 925 and the second port A of the logic element cage 814. The illustrated spring guide 815 is retained by a spring ring 807. The spring ring 807 is installed in a machined groove 899 in the logic element cage 814. In embodiments, Port A is connected to tank, or in yet other embodiments can be connected to a pilot signal if the application required the logic element pressure setting to be variable.

In embodiments of using a multi-functional cartridge valve constructed according to principles of the present disclosure, hydraulic fluid can be supplied from a pump to Port D of the valve 800. The control valve spool 821 allows flow from Port D to the internal volume distally below the spool 821. Fluid under the spool 821 communicates with the internal volume above the spool 821 (the spool bias spring chamber 893) through the filter core 822. Fluid above the spool 821 communicates with the internal volume below the pilot poppet 827 through the orifice disc 825. The pressure exerted by the fluid in the internal volume below the pilot poppet 827 acts to push the pilot poppet 827 up off the seat 826. When the pressure force acting on the pilot poppet 827 exceeds the force exerted by the pilot spring 829 on the pilot poppet 827, the pilot poppet 827 unseats and fluid passes between the seat 826 and the pilot poppet 827, through the communication passage between the pole piece 843 and the tube 819, and out a cylindrical hole provided in the tube thread to Port E.

Flow through the area created when the pilot poppet 827 lifts off the seat 826 results in a pressure drop in the volume just distally under the pilot poppet 827. The difference in pressure between the volume under the seat 826, the volume above the control valve spool 821 and distally below the spool 821 causes flow through the filter core 822 and the orifice disc 825.

The resulting pressure drop across the filter core orifice causes an unbalanced pressure force on the spool 821. When the net pressure force acting upon the spool 821 exceeds the downward force of the spool bias spring 844, the spool 821 moves proximally, thereby closing off flow from Port D.

The pressure in the volume distally under the spool 821 also acts to unseat the logic element poppet 817 from the seat 818 in the lower logic element portion of the valve. The logic element poppet 817 is biased against the seat 818 by the force exerted by the logic element spring 816 in the lower portion of the valve. The logic element poppet 817 blocks the passage of flow between the volume distally under the control valve spool 821 and Port B of the valve until the logic element poppet 817 is unseated.

With no current applied to the coil 855, the pressure in the volume below the spool 821 is less than what is required to unseat the logic element poppet 817. When current is applied to the coil 855, the plunger 831 is attracted to the pole piece 843. This compresses the pilot spring 829 and increases the force holding the pilot poppet 827 against the seat 826 resulting in a higher pressure above and below the spool 821 before the spool 821 shifts to close off Port D. When the current is increased enough, the pressure in the volume below the spool 821 exceeds the crack pressure of the logic element poppet 817 and the logic element poppet 817 unseats from the logic element seat 818, thereby allowing flow either to or from Port B.

If the pressure at Port B is lower than the pressure in the volume under the spool 821, flow will enter the valve 800 from Port D, travel through the spool 821, through the flow area created by the logic element seat 818 and the logic element poppet 817, and out of Port B. If the pressure at Port B is higher than the pressure under the spool 821, flow will enter the valve 800 from Port B and pass through the area created by the logic element seat 818 and the logic element poppet 817. This flow will increase the pressure in the volume under the spool 821, thereby causing the spool 821 to shift up and close off Port D. With a steady current maintained to the coil 855, the pressure above the spool 821 will remain relatively constant. Additional flow from Port B will cause the spool 821 to continue shifting up until Port E is opened. Flow from the volume under the spool 821 passes through the spool 821 and out Port E. Flow in or out of Port B will continue until the pressure under the spool 821 and at Port B is equalized or until the current at the coil 855 is dropped so that the pressure under the spool 821 is below the crack pressure of the logic element poppet 817. Once the pressure under the spool 821 is below the crack pressure of the logic element poppet 817, the logic element poppet 817 will again reseat against the logic element seat 818 and stop flow to or from Port B.

The valve 800 provides a load sense port with a reverse flow check ball 806 from Port C. The load sense check ball 806 is movably arranged with the load sense port C such that the load sense check ball 806 substantially prevents the flow of fluid into the load sense passageway 920 through the load sense port C but allows the flow of fluid from the load sense passageway 920 out of the load sense port C.

In embodiments, Port A is a drain of the logic element spring chamber 898 to the system reservoir. In yet other embodiments, Port A could receive a pilot signal that would allow the pressure setting of the logic element to be variable.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multifunctional proportional control valve comprising:
    a control valve portion, the control valve portion including a control valve cage and a hollow spool, the control valve cage defining a longitudinal interior passageway, a tank port, and a pump port, the tank and pump ports in communication with the interior passageway, the spool defining a longitudinal spool passageway and a plurality of cross holes radially arranged about the spool, the cross holes in communication with the spool passageway and the interior passageway of the control valve cage, the spool disposed within the interior passageway of the control valve cage and reciprocally movable over a range of travel between a pump flow position in which the pump port of the control valve cage is open and the tank port of the control valve cage is closed and a tank flow position in which the tank port of the control valve cage is open and the pump port of the control valve cage is closed, the spool being biased to the pump flow position;
    a logic element portion in communication with the control valve portion, the logic element portion including a logic element cage and a logic element poppet, the logic element cage defining a longitudinal interior logic element passageway and a logic element port in communication with the logic element passageway, the logic element passageway in communication with the spool passageway, the logic element poppet disposed within the logic element passageway of the logic element cage and reciprocally movable over a range of travel between a blocking position in which the logic element port of the logic element cage is closed and a logic element through-flow position in which the logic element port of the logic element cage is open, the logic element poppet being biased to the blocking position such that the logic element poppet remains in the blocking position until a pressure at least equal to a crack pressure is applied to the logic element poppet against the biasing force, thereby unseating the logic element poppet from the blocking position and moving the logic element poppet toward the through-flow position;
    wherein the control valve portion and the logic element portion are contained within a single cartridge arrangement.

2. The multifunctional proportional control valve according to claim 1, further comprising:
    an electro-magnetic actuator assembly adapted to selectively maintain the position of the spool of the control valve portion relative to the control valve cage such that a sufficient amount of fluid flowing into an upstream area of the logic element passageway between the logic element poppet and the spool passageway is pressurized to the crack pressure.

3. The multifunctional proportional control valve according to claim 2, wherein the spool of the control valve portion is biased to the pump flow position by a spool bias spring, and the electro-magnetic actuator assembly includes a hollow tube, a coil mounted to the tube, a movable armature disposed within the tube, a hollow pole piece disposed within the tube, and a pilot poppet assembly extending through the pole piece and interengaged with the armature and the spool bias spring, the tube and the control valve cage being in connected relationship to each other.

4. The multifunctional proportional control valve according to claim 3, wherein the pilot poppet assembly includes a pilot poppet, a pilot spring interposed between the armature and the pilot poppet, a seat retained within the pole piece and defining a longitudinal bore therethrough, and an orifice interposed between the longitudinal bore and the spool bias spring, the orifice in communication with the spool passageway, and wherein the pilot spring urges the pilot poppet into sealing engagement with the seat such that the longitudinal bore is occluded until a poppet lifting force is applied in a direction from the orifice toward the pilot spring.

5. The multifunctional proportional control valve according to claim 4, wherein the control valve portion includes a filter core disposed within the spool passageway, the filter core interposed between the radial cross holes of the spool and the orifice of the pilot poppet assembly, the filter core being configured such that particles greater than a predetermined size are substantially prevented from flowing past the filter core to the orifice.

6. The multifunctional proportional control valve according to claim 5, further comprising:
    a load sense portion in communication with the control valve portion and the logic element portion, the load sense portion including a logic element seat interposed between the control valve cage and the logic element cage, the logic element seat defining a longitudinal load sense passageway therethrough and a load sense port in communication with the load sense passageway, the load sense passageway in communication with the spool passageway of the control valve portion and the logic element poppet.

7. The multifunctional proportional control valve according to claim 6, wherein the load sense portion includes a load sense check ball movably arranged with the load sense port such that the load sense check ball substantially prevents the flow of fluid into the load sense passageway through the load sense port but allows the flow of fluid from the load sense passageway out of the load sense port.

8. The multifunctional proportional control valve according to claim 7, wherein the logic element portion includes a poppet bias spring to bias the logic element poppet to the blocking position, the poppet bias spring disposed within the logic element cage.

9. The multifunctional proportional control valve according to claim 8, wherein the logic element portion includes a spring guide, a distal end of the poppet bias spring engaged with the spring guide, and a proximal end of the poppet bias spring engaged with the logic element poppet.

10. The multifunctional proportional control valve according to claim 9, wherein the logic element cage defines a second port in communication with the logic element passageway, the spring guide defining a passageway therethrough, the passageway of the spring guide in communication with the logic element passageway and the second port of the logic element cage, the second port in fluid isolation with respect to the logic element port of the logic element cage.

11. The multifunctional proportional control valve according to claim 10, wherein the fluid isolation between the logic element port and the second port of the logic element cage is provided by a piston seal mounted to an external surface of the logic element poppet to provide a running seal between the logic element poppet and the logic element passageway of the logic element cage.

12. The multifunctional proportional control valve according to claim 1, further comprising:
   a load sense portion in communication with the control valve portion and the logic element portion, the load sense portion including a logic element seat interposed between the control valve cage and the logic element cage, the logic element seat defining a longitudinal load sense passageway therethrough and a load sense port in communication with the load sense passageway, the load sense passageway in communication with the spool passageway of the control valve portion and the logic element poppet.

13. The multifunctional proportional control valve according to claim 12, wherein the load sense portion includes a load sense check ball movably arranged with the load sense port such that the load sense check ball substantially prevents the flow of fluid into the load sense passageway through the load sense port but allows the flow of fluid from the load sense passageway out of the load sense port.

14. The multifunctional proportional control valve according to claim 1, wherein the logic element portion includes a poppet bias spring to bias the logic element poppet to the blocking position, the poppet bias spring disposed within the logic element cage.

15. The multifunctional proportional control valve according to claim 14, wherein the logic element portion includes a spring guide, a distal end of the poppet bias spring engaged with the spring guide, and a proximal end of the poppet bias spring engaged with the logic element poppet.

16. The multifunctional proportional control valve according to claim 15, wherein the logic element cage defines a second port in communication with the logic element passageway, the spring guide defining a passageway therethrough, the passageway of the spring guide in communication with the logic element passageway and the second port of the logic element cage, the second port in fluid isolation with respect to the logic element port of the logic element cage.

17. The multifunctional proportional control valve according to claim 16, wherein the fluid isolation between the logic element port and the second port of the logic element cage is provided by a piston seal mounted to an external surface of the logic element poppet to provide a running seal between the logic element poppet and the logic element passageway of the logic element cage.

* * * * *